H. F. WOODWARD.
Overalls.
No. 8,093. Reissued Feb. 19, 1878.
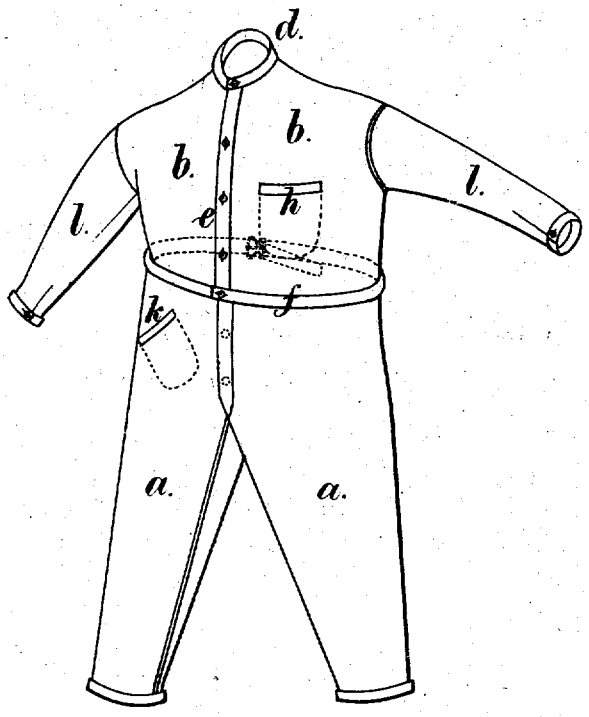
Witnesses
Chas H. Smith
Harold Purell
Inventor
Henry F. Woodward.
per L. N. Serrell
atty.

UNITED STATES PATENT OFFICE.

HENRY F. WOODWARD, OF NEW YORK, N. Y.

IMPROVEMENT IN OVERALLS.

Specification forming part of Letters Patent No. 153,292, dated July 21, 1874; Reissue No. 8,093, dated February 19, 1878; application filed September 10, 1874.

*To all whom it may concern:*

Be it known that I, HENRY F. WOODWARD, of the city and State of New York, have invented an Improvement in Workmen's Overalls, of which the following is a specification:

Children's night-garments have been made with an opening down the back, the waist and drawers being connected together; but a garment of this character is not adapted to workmen, either in appearance or for convenience, because the fastenings are not easily accessible, and are liable to be broken by the movements of the body. Under-garments to cover the person have been made of buckskin, open down the breast, and with a seam at the waist, and bathing-suits have been similarly made.

My invention relates to the exterior garment used by workmen, and known as "overalls," provided with sleeves and pockets, and open down the front to the crotch, or nearly so; and said invention consists in constructing the front portions of such overalls of one piece of woven fabric running from the shoulder down to the bottom of the leg, thereby avoiding any seam at the front portion of the garment.

It is well known that the strain and wear come chiefly on this front portion of the garment, and by avoiding any seam at the waist greater strength and durability are obtained than heretofore.

Drawers have been made that open down the front to the crotch; but they are in two parts, sewed or buttoned at the waist; and in other instances drawers and bathing-suits have been made in one piece from the shoulders down the fronts, but only open down to the waist.

By this construction the entire person is covered with the overalls, freedom of movement to the arms and legs is allowed for, the under-garments are kept clean, and the body is protected from cold, especially around the waist.

In the drawing I have represented, by a perspective view, the said improved overall.

The legs *a* and body *b* are made of suitable flexible material, usually of heavy cotton goods. The same is cut out and joined by seams so as to fit the person. I make the entire garment, except the sleeves, of two main sections, the fabric running from the neck-band *d* to the bottom of the leg portions or drawers *a*, and extending from the front connecting bands or hems *e* around to the central seam, that unites these two main sections at the back. Thereby the overalls are not liable to injury, because the seams are not exposed to strain.

The waistband *f* is preferably sewed to the fabric at the front, and loose at the back, and provided with a buckle. This waistband serves to gather the garment about the person at the waist, and painters can carry a dusting-brush in the band at the back.

I prefer buttons and button-holes for fastening the garment together down the front. The pockets *h* and *k* are inserted at each side of the front opening. The sleeves *l* are of the character used in workmen's jackets.

The overall made in this manner is a new and very useful article of manufacture.

I claim as my invention—

As a new article of manufacture, the workman's overalls, open down the front to the crotch, or nearly so, provided with sleeves, pockets, and waistband, and in which the woven fabric of the front of the garment extends in one piece from the shoulder to the bottom of the leg, so as to avoid a seam at the front of the waist, substantially as set forth.

Signed by me this 8th day of September, A. D. 1874.

HENRY F. WOODWARD.

Witnesses:
HAROLD SERRELL,
CHAS. H. SMITH.